United States Patent
Takizawa et al.

(10) Patent No.: US 10,105,627 B2
(45) Date of Patent: Oct. 23, 2018

(54) PARTICULATE FILTER PROVIDED WITH CATALYST AND METHOD FOR MANUFACTURING SAID FILTER

(71) Applicant: MAZDA MOTOR CORPORATION, Hiroshima (JP)

(72) Inventors: Tomoya Takizawa, Hiroshima (JP); Koichiro Harada, Hiroshima (JP); Takashi Baba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 36 days.

(21) Appl. No.: 15/305,423

(22) PCT Filed: May 14, 2015

(86) PCT No.: PCT/JP2015/002448
§ 371 (c)(1),
(2) Date: Oct. 20, 2016

(87) PCT Pub. No.: WO2016/031102
PCT Pub. Date: Mar. 3, 2016

(65) Prior Publication Data
US 2017/0036153 A1    Feb. 9, 2017

(30) Foreign Application Priority Data

Aug. 25, 2014  (JP) ................... 2014-170350
Aug. 25, 2014  (JP) ................... 2014-170363

(51) Int. Cl.
*F01N 3/10*     (2006.01)
*B01D 46/00*   (2006.01)
(Continued)

(52) U.S. Cl.
CPC ..... *B01D 46/0061* (2013.01); *B01D 46/0027* (2013.01); *B01D 53/944* (2013.01);
(Continued)

(58) Field of Classification Search
CPC .......... B01D 53/865; B01D 2255/2065; B01D 2255/2092; B01D 53/944; B01J 23/63
(Continued)

(56) References Cited

U.S. PATENT DOCUMENTS

| 4,902,487 A | 2/1990 | Cooper et al. |
| 2002/0197191 A1 | 12/2002 | Takeshima et al. |

(Continued)

FOREIGN PATENT DOCUMENTS

| JP | H01-318715 A | 12/1989 |
| JP | 2002-035587 A | 2/2002 |

(Continued)

OTHER PUBLICATIONS

International Search Report issued in PCT/JP2015/002448; dated Jul. 21, 2015.

*Primary Examiner* — Tom P Duong
(74) *Attorney, Agent, or Firm* — Studebaker & Brackett PC (57) ABSTRACT

A catalyst 20 provided for a filter body for combusting PM contains activated aluminas 21 and 22, active-oxygen-release materials 23 and 24, catalytic metal 25, and alkali earth metal 26. The alkali earth metal 26 is loaded on each of the activated aluminas 21 and 22, and the active-oxygen-release materials 23 and 24. A percentage by mass of the alkali earth metal 26, loaded on the active-oxygen-release materials 23 and 24, to the active-oxygen-release material is smaller than a percentage by mass of the alkali earth metal 26, loaded on the activated aluminas 21 and 22, to the activated alumina.

10 Claims, 8 Drawing Sheets

(51) Int. Cl.
- *B01J 23/58* (2006.01)
- *F01N 3/023* (2006.01)
- *F01N 3/035* (2006.01)
- *B01D 53/94* (2006.01)
- *B01J 23/63* (2006.01)
- *B01J 37/02* (2006.01)
- *B01J 37/03* (2006.01)
- *B01J 23/00* (2006.01)
- *B01J 35/04* (2006.01)
- *B01D 46/24* (2006.01)
- *B01J 27/232* (2006.01)

(52) U.S. Cl.
CPC ........ *B01D 53/9413* (2013.01); *B01J 23/002* (2013.01); *B01J 23/58* (2013.01); *B01J 23/63* (2013.01); *B01J 37/0203* (2013.01); *B01J 37/0215* (2013.01); *B01J 37/0248* (2013.01); *B01J 37/03* (2013.01); *F01N 3/023* (2013.01); *F01N 3/035* (2013.01); *F01N 3/10* (2013.01); *B01D 46/2418* (2013.01); *B01D 2255/1021* (2013.01); *B01D 2255/1023* (2013.01); *B01D 2255/204* (2013.01); *B01D 2255/2042* (2013.01); *B01D 2255/2045* (2013.01); *B01D 2255/2047* (2013.01); *B01D 2255/2063* (2013.01); *B01D 2255/2065* (2013.01); *B01D 2255/2068* (2013.01); *B01D 2255/2092* (2013.01); *B01D 2255/20715* (2013.01); *B01D 2255/407* (2013.01); *B01D 2255/908* (2013.01); *B01D 2255/915* (2013.01); *B01D 2255/9155* (2013.01); *B01D 2279/30* (2013.01); *B01J 27/232* (2013.01); *B01J 35/04* (2013.01); *B01J 2523/00* (2013.01); *F01N 2330/06* (2013.01); *F01N 2370/00* (2013.01)

(58) Field of Classification Search
USPC .................................. 422/177, 180; 502/304
See application file for complete search history.

(56) References Cited

U.S. PATENT DOCUMENTS

| | | |
|---|---|---|
| 2007/0196245 A1 | 8/2007 | Fujita et al. |
| 2014/0228209 A1 | 8/2014 | Aoki |

FOREIGN PATENT DOCUMENTS

| | | |
|---|---|---|
| JP | 2005-152774 A | 6/2005 |
| JP | 2007-218219 A | 8/2007 |
| JP | 2013-091041 A | 5/2013 |

PARTICULATE FILTER PROVIDED WITH CATALYST AND METHOD FOR MANUFACTURING SAID FILTER

TECHNICAL FIELD

The present invention relates to a particulate filter provided with a catalyst and a method for manufacturing the filter.

BACKGROUND ART

Exhaust gas from diesel engines and lean-burn gasoline engines includes particulates (particulate matter) composed mostly of carbon. To collect the particulates, a filter is provided in an exhaust gas passage. When the amount of the collected particulates increases, the particulates are combusted and removed from the filter for the regeneration of the filter. In order to promote the combustion of the particulates, a catalyst is loaded on the filter body.

The above catalyst includes a typical Pt/alumina catalyst having Pt loaded on alumina. PATENT DOCUMENT 1 discloses a technique which involves loading a granular material having a predetermined particle size distribution on a filter body, and then impregnating the granular material with a Pt solution to load a granular material on the filter body. The document cites that examples of the granular material include γ-alumina and ceria, and the granular material may contain alkali earth metal allowing the catalyst to absorb and reduce NOx.

CITATION LIST

Patent Document

PATENT DOCUMENT 1: Japanese Unexamined Patent Publication No. 2005-152774

SUMMARY OF THE INVENTION

Technical Problem

Alkali earth metal stores NOx included in exhaust gas to produce nitrate. With this alkali earth metal loaded on the filter body, active oxygen is released in association with decomposition of the nitrate produced when the NOx is stored. This active oxygen oxidizes particulates, and the oxidization promotes the combustion of the particulates.

The inventors of the present invention mixed Pt-loaded activated alumina and an active-oxygen-release material (an oxide taking oxygen included in the exhaust gas and releasing the taken oxygen as active oxygen), and coated the filter body with the mixture. The inventors then prepared an aqueous solution of alkaline-earth metal salt, and impregnated a layer of the mixture with the solution, so that the alkali earth metal salt was loaded on the coated layer. The inventors then carried out a combustion test of the particulates. According to the test, the use of the alkali earth metal showed an improvement in performance of combusting particulates; however, the effect of the improvement was less than expected.

The inventors carried out a series of experiments to find out why the effect of the alkali earth metal on the improvement in the particulates combustion performance fell below expectation. As a result, the inventors found out that, in the above technique to load the alkali earth metal, the alkali earth metal was substantially equally loaded on the activated alumina and the active-oxygen-release material, and observed that the alkali earth metal, loaded on the active-oxygen-release material, produced negative effects in the combustion of the particulates. Specifically, the inventors found out that an excessive amount of alkali earth metal loaded on the active-oxygen-release material either reduced the amount of the active oxygen released from the active-oxygen-release material, or covered an active site on the surface of the active-oxygen-release material. As a result, the inventors observed that the excessive alkali earth metal was a cause of the unsatisfactory combustion improvement effect.

The present invention is conceived in view of the above problems, and intends to prepare a catalyst so that alkali earth metal effectively works to promote combustion of particulates, reduce usage of catalytic metal such as Pt, and lower a cost of the catalyst.

Solution to the Problem

In order to solve the above problems, the present invention allows a larger amount of alkali earth metal to be loaded on activated alumina than on an active-oxygen-release material.

Presented here is a particulate filter including: a filter body collecting particulates included in exhaust gas; an exhaust gas pathway wall included in the filter body; and a catalyst provided for the exhaust gas pathway wall and combusting the particulates, wherein
the catalyst contains activated alumina, an active-oxygen-release material, catalytic metal, and alkali earth metal, the active-oxygen-release material including one, or two or more kinds of oxide taking in oxygen included in the exhaust gas and releasing the oxygen thus taken in as active oxygen,
the alkali earth metal is loaded on each of the activated alumina and the active-oxygen-release material, and
a percentage by mass of the alkali earth metal, loaded on the active-oxygen-release material, to the active-oxygen-release material is smaller than a percentage by mass of the alkali earth metal, loaded on the activated alumina, to the activated alumina.

In the above particulate filter, the alkali earth metal loaded on each of the activated alumina and the active-oxygen-release material traps NOx included in the exhaust gas. When catching NOx, the alkali earth metal changes from carbonate to nitrate. When the filter is regenerated (when the particulates are removed through combustion), the nitrate is dissolved with a rise in temperature of the exhaust gas. The active oxygen released by the dissolution of the nitrate and the active oxygen released from the active-oxygen-release material work as oxidant to promote the combustion of the particulates by the catalytic metal.

Here, the amount of active oxygen, released by the dissolution of the nitrate, increases with the increase in amount of the alkali earth metal in the catalyst. This is advantageous in promoting the combustion of the particulates. As described before, however, if the amount of alkali earth metal loaded on the active-oxygen-release material increases, the alkali earth metal reduces the release of the active oxygen from the active-oxygen-release material. This is disadvantageous in promoting the combustion of the particulates.

The inventors of the present invention conducted a further study to find out that the release of the active oxygen is not interfered as long as the alkali earth metal is loaded in small amount on the active-oxygen-release material. The inventors have found out that the small amount of the alkali earth metal actually encourages the combustion of the particulates as will be discussed later.

The inventors of the present invention focus their attention on a fact that activated alumina has a large specific surface area, and allow much alkali earth metal to be loaded on this activated alumina. Meanwhile, the inventors have observed that the active-oxygen-release material is characterized by releasing active oxygen when the filter is regenerated, and allow little alkali earth metal to be loaded on this active-oxygen-release material. Hence, the present invention may increase the amount of active oxygen to be released from the entire catalyst, without deteriorating the performance of the active-oxygen-release material that is effective in promoting the combustion of the particulates. Furthermore, the present invention may enhance the active oxygen releasing performance of the active-oxygen-release material. Such features allow the present invention to efficiently combust the particulates and remove them from the filter body without increasing the amount of catalytic metal.

In a beneficial embodiment of the particulate filter, the active-oxygen-release material may include a Ce-containing composite oxide and a Ce-free Zr-based composite oxide, and an amount of the alkali earth metal loaded on the activated alumina may be greater than a total amount of the alkali earth metal loaded on the Ce-containing composite oxide and the Ce-free Zr-based composite oxide.

Here, the Ce-containing composite oxide stores oxygen included in the exhaust gas and releases the oxygen as active oxygen, with the reversible progress of a reaction in association with a valence change of Ce. The Ce-free Zr-based composite oxide, which is highly ion-conducive, takes oxygen in from its environment by oxygen exchange reaction, and releases active oxygen.

A percentage by mass of the alkali earth metal loaded on the activated alumina to the activated alumina may range from 3% by mass to 14% by mass. Such a feature may increase the performance of the catalyst to combust the particulates. Here, if the alkali earth metal is loaded in large amount on the activated alumina, the catalytic metal loaded on the activated alumina is covered by the alkali earth metal, causing the catalyst to be less active. More beneficially, the percentage by mass may range from 5% by mass to 12% by mass.

A percentage by mass of the alkali earth metal loaded on the active-oxygen-release material to the active-oxygen-release material may beneficially be smaller than or equal to 2% by mass, and more beneficially be smaller than or equal to 1% by mass. Thus, the alkali earth metal, loaded on the active-oxygen-release material, may be used for the promotion of the combustion of the particulates while curbing a significant deterioration in the function of the active-oxygen-release material. A lower limit of the percentage by mass may be, for example, 0.05% by mass.

The alkali earth metal may be Mg, Ca, Sr, or Ba. One kind of alkali earth metal may be used alone. Two or more kinds of alkali earth metal may be used in combination. Specifically, the alkali earth metal may include at least Sr.

Beneficially, the catalytic metal may include at least one of Pt or Pd. Such a feature may be advantageous in promoting the combustion of the particulates.

In a beneficial embodiment of the particulate filter, the catalyst may further include a binder finer than particles of the activated alumina, and the alkali earth metal may be loaded on each of the activated alumina, the active-oxygen-release material, and the binder, and a total amount of the alkali earth metal, loaded on each of the activated alumina and the binder, may be 90% by mass or greater of a total amount of the alkali earth metal included in the catalyst.

Such features allow the alkali earth metal, loaded on each of the activated alumina, the active-oxygen-release material, and the binder, to catch NOx included in the exhaust gas. Here, the amount of active oxygen, released by the dissolution of the nitrate, increases with the increase in amount of the alkali earth metal in the catalyst. This is advantageous in promoting the combustion of the particulates. As described before, however, if the amount of alkali earth metal loaded on the active-oxygen-release material increases, the alkali earth metal reduces the release of the active oxygen from the active-oxygen-release material. This is disadvantageous in promoting the combustion of the particulates. The activated alumina does not release active oxygen; however, if the amount of the alkali earth metal loaded on the activated alumina increases, the alkali earth metal covers the catalytic metal loaded on the activated alumina, causing the catalyst to be less active.

Hence, 90% by mass or more of the full amount of the alkali earth metal included in the catalyst is loaded separately on the activated alumina and the binder. Such a feature may increase the total amount of the alkali earth metal included in the catalyst by allowing the alkali earth metal to be loaded on the binder while reducing the amount of the alkali earth metal loaded on the activated alumina and the active-oxygen-release material. This is advantageous in promoting the combustion of the particulates.

Beneficially, the binder may be an alumina binder or a zirconia binder.

In a beneficial embodiment of the particulate filter, a percentage of the loaded alkali earth metal to the activated alumina may range from 2% by mass to 7.8% by mass, and a percentage of the loaded alkali earth metal to the binder may range from 1.1% by mass to 17.1% by mass. According to such a feature, the alkali earth metal may be used efficiently for promoting the combustion of the particulates.

In a beneficial embodiment of the particulate filter, a percentage of an amount of the alkali earth metal, loaded on the activated alumina, in the total amount of the alkali earth metal loaded on each of the activated alumina and the binder may range from 24% by mass to 95% by mass. According to such a feature, the alkali earth metal may be used efficiently for promoting the combustion of the particulates. More beneficially, the percentage may range from 48% by mass to 85% by mass.

Furthermore, presented here is a method for manufacturing a particulate filter including a filter body collecting particulates included in exhaust gas, an exhaust gas pathway wall included in the filter body, and a catalyst provided for the exhaust gas pathway and combusting the particulates. The method includes:

preparing activated alumina, an active-oxygen-release material, alkali earth metal, and catalytic metal, the active-oxygen-release material including one, or two or more kinds of oxide taking in oxygen included in the exhaust gas and releasing the oxygen taken in as active oxygen;

loading the alkali earth metal on the activated alumina;

forming slurry which is a mixture of the activated alumina loaded with the alkali earth metal and the active-oxygen-release material, such that a portion of the alkali earth metal, dissolving from the activated alumina into the slurry, is loaded on the active-oxygen-release material;

coating the filter body with the slurry; and loading the catalytic metal either on the activated alumina and the active-oxygen-release material before the forming of the slurry, or on a coating layer formed when the filter body is coated with the slurry.

This manufacturing method allows the portion of the alkali earth metal, loaded on the activated alumina, to dissolve in the slurry and the dissolved portion to be loaded on the active-oxygen-release material, when the activated alumina loaded with the alkali earth metal and the active-oxygen-release material not loaded with alkali earth metal are mixed together to form the slurry. Since the alkali earth metal dissolving in the slurry is small in amount, the amount of the alkali earth metal loaded on the active-oxygen-release material is also small. As a result, the obtained catalyst may have a percentage by mass of the alkali earth metal, loaded on the active-oxygen-release material, to the active-oxygen-release material smaller than a percentage by mass of the alkali earth metal, loaded on the activated alumina, to the activated alumina.

Moreover, adopting the above dissolution and loading technique eliminates the need for loading the alkali earth metal on each of the activated alumina and the active-oxygen-release material before forming the slurry. In other words, the alkali earth metal may be loaded on the activated alumina alone, contributing to simplification of manufacturing processes and reduction of manufacturing costs.

In a beneficial embodiment of the manufacturing method, the preparing may further include preparing a binder finer than particles of the activated alumina, and, loading the alkali earth metal on each of the activated alumina and the binder, and in the forming, the slurry may be a mixture of the activated alumina loaded with the alkali earth metal, the binder loaded with the alkali earth metal, and the active-oxygen-release material.

Such features allow the particulate filter provided with a catalyst to have the alkali earth metal loaded on each of the activated alumina, the active-oxygen-release material, and the binder. Moreover, even if the portion of the alkali earth metal dissolves in the slurry, 90% by mass or more of the full amount of the alkali earth metal included in the catalyst stays in the activated alumina and the binder because the alkali earth metal is loaded on the activated alumina and the binder in advance. Such features contribute to providing the particulate filter with desirable performance.

Advantages of the Invention

In the particulate filter provided with a catalyst according to the present invention, the alkali earth metal is loaded on each of the activated alumina and the active-oxygen-release material, and the percentage by mass of the alkali earth metal, loaded on the active-oxygen-release material, to the active-oxygen-release material is smaller than the percentage by mass of the alkali earth metal, loaded on the activated alumina, to the activated alumina. Such features may promote combustion of particulates by active oxygen to be released when the nitrate of the alkali earth metal dissolves, while curbing a significant deterioration in the function of the active-oxygen-release material. Furthermore, those features may enhance the active oxygen releasing performance of the active-oxygen-release material, contributing to reduction in time taken to regenerate the filter, and improvement in fuel consumption of an engine. Moreover, the features may reduce a usage of the catalytic metal, which is advantageous in cost reduction.

In the method for manufacturing the particulate filter provided with a catalyst according to the present invention, the activated alumina loaded with the alkali earth metal and the active-oxygen-release material are mixed together to form the slurry, such that a portion of the alkali earth metal, dissolved from the activated alumina in the slurry, is loaded on the active-oxygen-release material. According to such features, a catalyst is obtained which has a percentage by mass of the alkali earth metal, loaded on the active-oxygen-release material, to the active-oxygen-release material smaller than a percentage by mass of the alkali earth metal, loaded on the activated alumina, to the activated alumina. Furthermore, the features eliminate the need for loading the alkali earth metal on the active-oxygen-release material before forming the slurry, contributing to simplification of manufacturing processes and reduction of manufacturing costs.

DESCRIPTION OF EMBODIMENTS

Embodiments of the present invention will be described below with reference to the drawings. Note that the following beneficial embodiments are essentially examples, and are not intended to limit the scope of the present invention, of the application of the present invention, or of the use of the present invention.

First Embodiment

Figure 1:
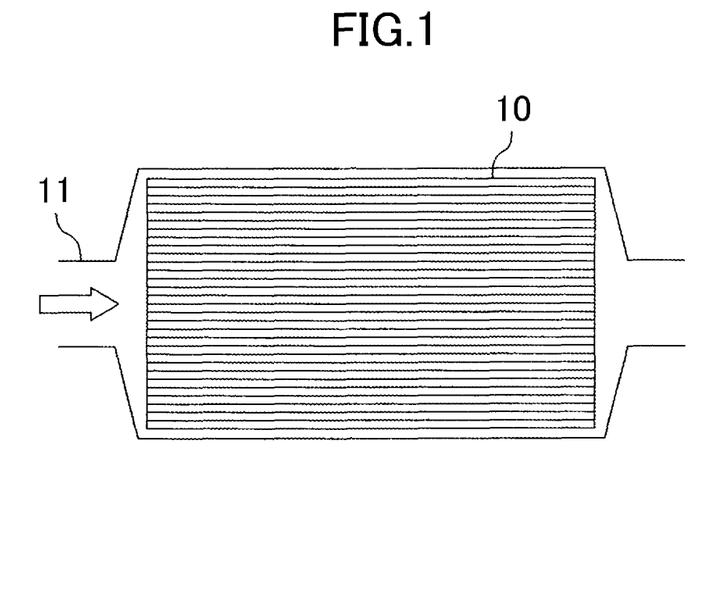
FIG. 1 is a diagram of a filter provided with a catalyst and placed in an exhaust gas passage of an engine.

As illustrated in FIG. 1, a particulate filter 10 provided with a catalyst (hereinafter simply referred to as a "catalyzed filter") is placed in an exhaust gas passage 11 of an engine such as a diesel engine. The catalyzed filter 10 collects particulates (hereinafter referred to as "PM") included in exhaust gas. An oxidized catalyst (not shown) may be provided for the exhaust gas pathway 11 placed upstream of the filter 10 in the direction of an exhaust gas flow. The oxidized catalyst includes a support made of, for example, an oxide, with catalytic metal such as Pt loaded on the support.

[Structure of Filter]

Figure 2:
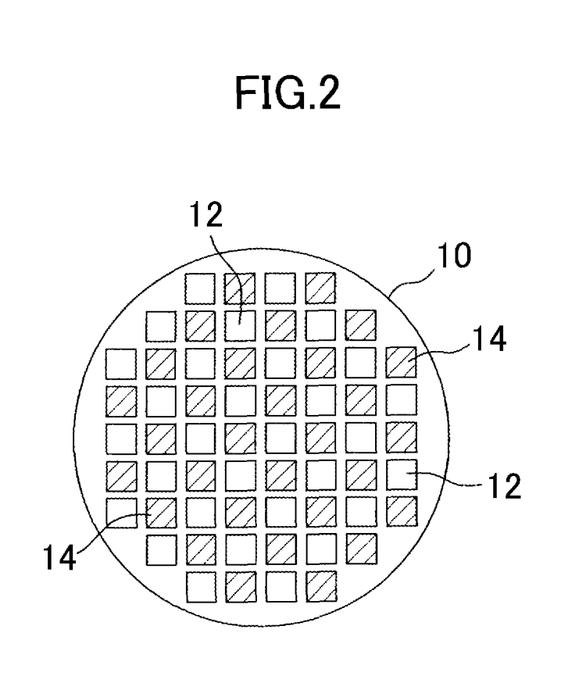
FIG. 2 is a front elevation view schematically illustrating the catalyzed filter.
Figure 3:
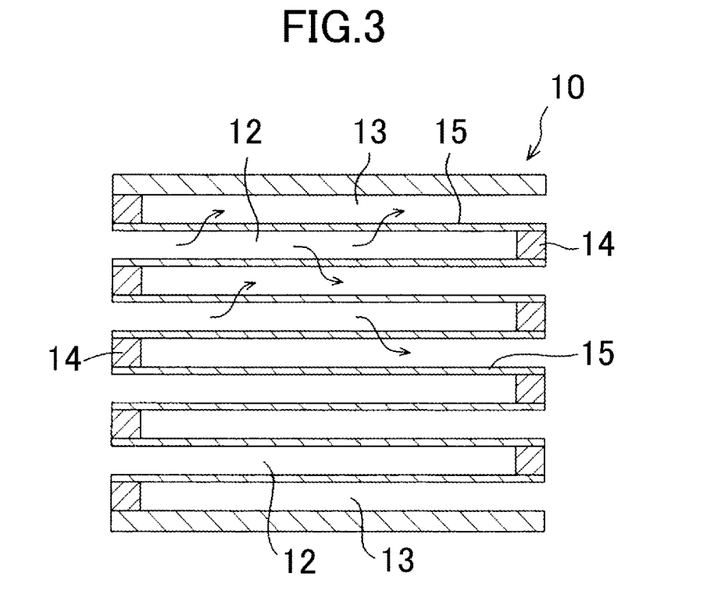
FIG. 3 is a longitudinal cross-sectional view schematically illustrating the catalyzed filter.

As schematically illustrated in FIGS. 2 and 3, the catalyzed filter 10 is provided in a honeycomb structure, and includes multiple exhaust gas passages; namely exhaust inlet paths 12 and exhaust outlet paths 13, extending in parallel to each other. The exhaust gas inlet paths 12 have downstream ends blocked by plugs 14. The exhaust gas outlet paths 13 have upstream ends blocked by plugs 14. The exhaust gas inlet paths 12 and the exhaust gas outlet paths 13 are alternately arranged and separated from one another by thin partitions 15. Hatched parts in FIG. 2 illustrate the plugs 14 at the upstream ends of the exhaust gas outlet paths 13.

Figure 4:
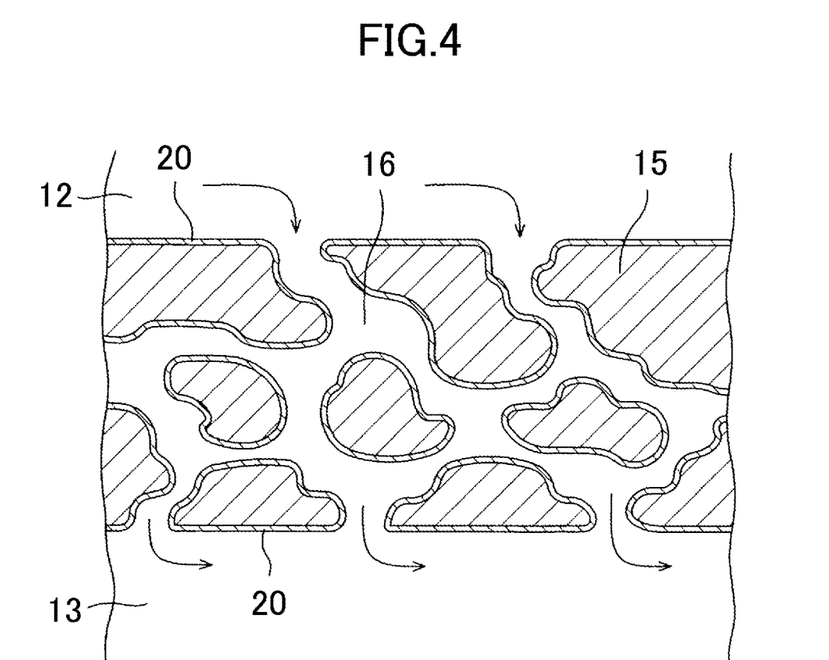
FIG. 4 is a magnified cross-sectional view schematically illustrating a wall of an exhaust gas passage of the filter.

In the catalyzed filter 10, a filter body including the partitions 15 is made of an inorganic porous material such as cordierite, SiC, $Si_3N_4$, sialon, or $AlTiO_3$. The exhaust gas flowing into the exhaust gas inlet paths 12 passes through the partitions 15 nearby, and flows into the neighboring exhaust gas outlet paths 13 as illustrated by allows in FIG. 3. As illustrated in FIG. 4, the partitions 15 include minute pores (exhaust gas passages) 16 allowing the exhaust gas inlet paths 12 to communicate with the exhaust gas outlet paths 13. The exhaust gas passes through the pores 16. PM is mainly captured by, and accumulated on, the walls of the exhaust gas inlet paths 12 and pores 16.

A catalyst 20 is provided to wall surfaces defining the exhaust gas passages (including the exhaust gas inlet paths 12, the exhaust gas outlet paths 13, and the pores 16) of the filter body. Note that the catalyst does not have to be provided on the walls facing the exhaust gas outlet paths 13.

[Catalyst]

Described next is a structure of the catalyst 20.

Figure 5:
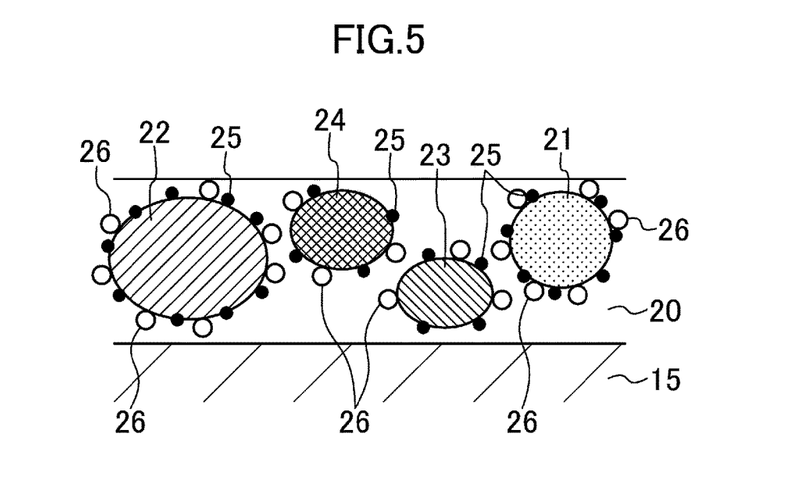
FIG. 5 is a cross-sectional view schematically illustrating a configuration of the catalyst of the filter according to a first embodiment.

As schematically illustrated in FIG. 5, the catalyst 20 contains: two or more kinds of activated alumina 21 and 22; and two or more kinds of active-oxygen-release materials 23, and 24 taking in oxygen included in the exhaust gas and releasing the oxygen thus taken in as active oxygen. Details of the catalyst 20 will be described below.

In this embodiment, two kinds of alumina; namely the activated aluminas 21 and 22, mainly include γ-alumina. One is pure alumina (first alumina) 21 which does not include an additive. The other is La-containing alumina (second alumina) 22 containing approximately 4% by mass of $La_2O_3$ as an additive. On each of the pure alumina 21 and the La-containing alumina 22, Pt 25 as catalytic metals and alkali earth metal 26 are loaded.

The catalytic metal may be other catalytic metal such as Pd than the Pt 25. Two or more kinds of catalytic metal may be loaded on the pure alumina 21 and the La-containing alumina 22. In this embodiment, the catalyst 20 contains the activated aluminas 21 and 22 loaded with the Pt 25. This feature allows the catalyst 20 to oxidize NO to $NO_2$ with high efficiency, which is beneficial to the promotion of PM combustion. Moreover, in this embodiment, not only the bulky La-containing alumina 22 but also pure alumina 21 is used as the activated alumina. Compared with the use of the La-containing alumina 22 alone, the additional use of the pure alumina 21 may reduce the bulkiness of the catalyst 20 in total. This is beneficial in reducing clogged exhaust gas pathways in the catalyzed filter.

In this embodiment, two kinds of active-oxygen-release materials, namely an active-oxygen-release material 23 and an active-oxygen-release material 24, are used. The active-oxygen-release material 23 is made of a Ce-containing composite oxide, and the active-oxygen-release material 24 is made of a Ce-free Zr-based composite oxide. In this embodiment, the active-oxygen-release material 23 is an Rh-doped CeZrNd composite oxide (Rh-doped CeZrNdOx) with an Rh-solid solution provided at lattice points or between the lattice points of the CeZrNd composite oxide. The active-oxygen-release material 24 is a ZrNdPr composite oxide (ZrNdPrOx). The Pt 25 and the alkali earth metal 26 are also loaded on the active-oxygen-release materials 23 and 24.

A percentage by mass of the alkali earth metal 26, loaded on the active-oxygen-release materials 23 and 24, to each of the active-oxygen-release materials 23 and 24 is smaller than that of the alkali earth metal 26, loaded on the activated aluminas 21 and 22, to each of the activated alumina 21 and 22. Moreover, the total amount of the alkali earth metal 26 loaded on the activated alumina 21 and 22 is larger than that of the alkali earth metal 26 loaded on the active-oxygen-release materials 23 and 24.

The active-oxygen-release material 24, including a Ce-free Zr-based composite oxide, may beneficially have an average pore size ranging from 20 nm to 60 nm. In the catalyzed filter 10, a gas space velocity per catalyst weight is significantly high. Here, the use of active-oxygen-release material 24, of which pores are relatively large, allows the exhaust gas to make contact not only with the surface of the active-oxygen-release material 24, but also with the pore portions easily. Such a feature contributes to efficient generation of active oxygen, which is beneficial to the promotion of PM combustion.

In a beneficial embodiment, the total amount of the activated aluminas 21 and 22 ranges from 4 g/L to 10 g/L, the amount of the active-oxygen-release material 23 composed of the Ce-based composite oxide ranges from 4 g/L to 10 g/L, and the amount of the active-oxygen-release material 24 composed of the Ce-free Zr-based composite oxide ranges from 6 g/L to 15 g/L.

When the above-mentioned pure alumina and La-containing alumina are used as the activated aluminas 21 and 22, a beneficial mass ratio representing pure alumina/La-containing alumina may range from 1/8 to 4/1. A beneficial total amount of the Pt 25, loaded on the activated aluminas 21 and 22 that are mixed together, may range from 0.3 g/L to 0.4 g/L. A beneficial amount of Pt loaded on each of the active-oxygen-release material 23 and the active-oxygen-release material 24 may range from 0.07 g/L to 1.0 g/L. The amount of the alkali earth metal loaded on the activated aluminas 21 and 22, and on the active-oxygen-release materials 23 and 24 will be described later.

[Estimating Mechanism of Promotion of PM Combustion]

When a temperature of the exhaust gas rises, the PM collected by the filter body combusts through the catalysis of the Pt 25 loaded on the activated aluminas 21 and 22, and on the active-oxygen-release materials 23 and 24. The Pt-loaded alumina—the activated aluminas 21 and 22 loaded with Pt—functions to oxidize NO included in the exhaust gas to $NO_2$. Acting as an oxidant, this $NO_2$ promotes the combustion of the PM.

The active-oxygen-release materials 23 and 24 promote the combustion of the PM by releasing active oxygen. Here, a Ce-free Zr-based composite oxide 24 (the active-oxygen-release material 24) takes in oxygen from its environment through oxygen exchange reaction, and releases active oxygen. Hence, the Pt loaded on this Ce-free Zr-based composite oxide 24 is kept actively oxidized, which demonstrates excellent PM combustion performance. Meanwhile, a Ce-containing composite oxide 23 (the active-oxygen-release material 23) has a high oxygen storage-release capacity. Even if the PM is combusted and the oxygen in the combusted portion is locally consumed, the oxygen released from this Ce-containing composite oxide 23 immediately compensates for the consumed oxygen to keep the PM combusting.

The alkali earth metal 26, loaded on the activated aluminas 21 and 22 and the active-oxygen-release materials 23 and 24, is carbonate when the alkali earth metal 26 does not store NOx. In the form of nitrate, the alkali earth metal 26 either stores NOx included in the exhaust gas (for example, if the alkali earth metal 26 is Sr, $SrCO_3 \leftrightarrows Sr(NO_3)_2$), or absorbs NOx. Then, the nitrate is dissolved as the temperature of the exhaust gas rises. The dissolution of the nitrate releases active oxygen, promoting the combustion of the particulates.

Moreover, a mixture of the pure alumina 21 and the La-containing alumina 22 as activated aluminas provides the catalyzed filter with the following features.

Figure 6:
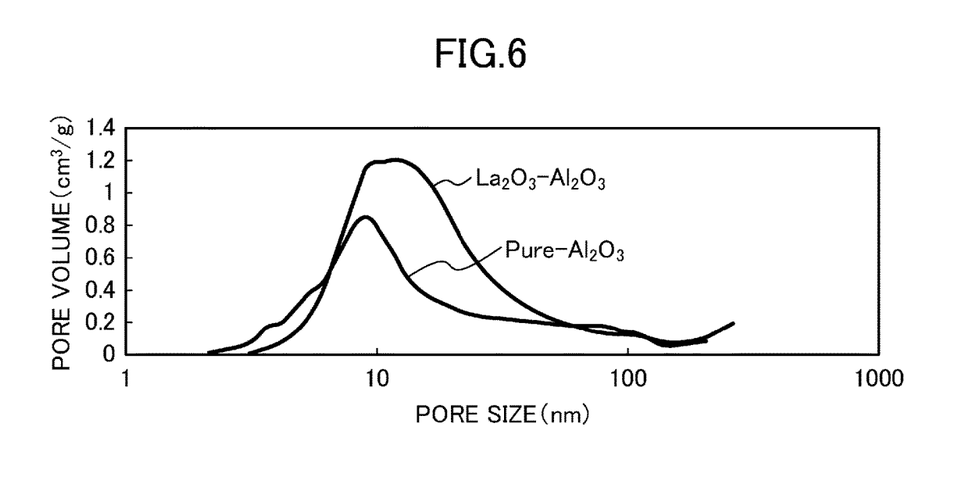
FIG. 6 is a graph illustrating a pore distribution in pure alumina and La-containing alumina

FIG. 6 illustrates the measurements of pore distribution of the pure alumina 21 and the La-containing alumina 22 (using SIMADZU, Micrometrics TriStar3000). The pore distribution of the pure alumina 21 shows a sharp peak observed around a pore diameter of 10 nm. Meanwhile, the pore distribution of the La-containing alumina 22 shows a broad peak observed around and greater than 10 nm, and including many pores each having a diameter greater than 10 nm. In the examples of FIG. 6, the pure alumina 21 has an average pore size of 10.07 nm, and an average pore volume of 0.537 $cm^3/g$. The La-containing alumina 22 has an average pore size of 13.15 nm, and an average pore volume of 0.822 $cm^3/g$.

As the examples show, the pure alumina 21 is smaller in pore diameter than the La-containing alumina 22, and the amount of the Pt 25 loaded on the surface of the pure alumina 21 is greater than that loaded on the surface of the La-containing alumina 22. As a result, the pure alumina 21 allows the exhaust gas to easily make contact with the Pt 25 so that much $NO_2$ is produced, which is advantageous for promoting the combustion of the PM. Moreover, unlike the (basic) La-containing alumina 22, the pure alumina 21 is amphoteric and has an acid site. Thus, the pure alumina 21 firmly bonds with the Pt 25. Such a feature keeps the Pt 25 from condensing even if being exposed to hot exhaust gas, which contributes to maintaining excellent PM combustion performance for a long time.

Meanwhile, the La-containing alumina 22 is smaller in apparent specific gravity than the pure alumina 21; that is, the La-containing alumina 22 is high in heat resistance even though it is bulky. Moreover, being bulky, the La-containing alumina 22 is good in gas diffusion and makes good contact with the exhaust gas.

Thus, the mixture of the pure alumina 21 and the La-containing alumina 22 allows (i) the La-containing alumina 22 to achieve higher heat resistance of the catalyst and greater gas diffusion, and (ii) the pure alumina 21 to enhance PM combustion performance. In addition, the use of the pure alumina 21 may reduce the bulkiness of the activated alumina in total. The reduced bulkiness keeps the catalyst from increasing in volume, which avoids the risk that the exhaust gas pathways of the filter become narrow. Such features contribute to reduction in (i) the rise of engine back-pressure generated by a catalyzed filter, and (ii) the clogging of the filter, followed by less frequent processes for the regeneration of the filter. This successfully avoids deterioration of fuel consumption.

[How to Manufacture Catalyzed Filter]

Activated alumina such as the La-containing alumina and the pure alumina may be powdered ones available in the market. The preparation technique below allows the production of the Rh-doped CeZrNd composite oxide as the active-oxygen-release material 23, and the ZrNdPr composite oxide as the active-oxygen-release material 24.

—Preparing Rh-doped CeZrNd Composite Oxide—

Cerium nitrate hexahydrate, a zirconyl oxynitrate solution, neodymium nitrate hexahydrate, and a rhodium nitrate solution are dissolved in deionized water. This nitrate solution is mixed with an eight-fold dilution of 28% by mass of ammonia water to neutralize the mixture, thereby obtaining a coprecipitate. A solution containing this coprecipitate is centrifugalized and a supernatant liquid of the solution is removed (dewatering). Then, the deionized water is added to the dewatered coprecipitate, and the dewatered coprecipitate is stirred (washing). The dewatering and the washing are alternated for as many times as needed. The coprecipitate left after the final dewatering is dried in the air at 150° C. for 24 hours, and pulverized by a ball mill. Then, the pulverized coprecipitate is calcined in the air at 500° C. for two hours. In this manner, a Rh-doped CeZrNd composite oxide particle material is obtained.

—Preparing ZrNdPr Composite Oxide—

Praseodymium nitrate hexahydrate, a zirconyl oxynitrate solution, and neodymium nitrate hexahydrate are dissolved in deionized water. This nitrate solution is mixed with an eight-fold dilution of 28% by mass of ammonia water to neutralize the mixture, thereby obtaining a coprecipitate. A solution containing this coprecipitate is centrifugalized and supernatant liquid of the solution is removed (dewatering). Then, the deionized water is added to the dewatered coprecipitate, and the dewatered coprecipitate is stirred (washing). The dewatering and the washing are alternated for as many times as needed. The coprecipitate left after the final dewatering is dried in the air at 150° C. for 24 hours, and pulverized by a ball mill. Then, the pulverized coprecipitate is calcined in the air at 500° C. for two hours. In this manner, the ZrNdPr composite oxide is obtained.

—Loading Pt on Active-Oxygen-Release Material—

The Rh-doped CeZrNd composite oxide and the ZrNdPr composite oxide are mixed together. Deionized water is added to the mixture so that the mixture becomes slurry. This slurry is stirred sufficiently by a stirrer, for example. While the slurry is kept stirred, a predetermined amount of ethanolamine Pt (ethanolamine hexahydroxyplatinate (IV) solution) is dripped to the slurry, and the mixture is sufficiently stirred. Then, the product is further stirred under heat to completely vaporize the water. After the evaporation of the water, the obtained dried substance is pulverized, and then calcined in the air at 500° C. for two hours. Thus, obtained is catalyst powder including the Rh-doped CeZrNd composite oxide and the ZrNdPr each loaded with Pt.

—Loading Pt and Alkali Earth Metal on Activated Alumina—

Multiple kinds of activated alumina (pure alumina and La-containing alumina) are mixed together. Deionized water is added to the mixture so that the mixture becomes slurry. This slurry is sufficiently stirred by a stirrer, for example. While the slurry is kept stirred, a predetermined amount of ethanolamine Pt is dripped to the slurry. Then, the slurry is further stirred, and a predetermined amount of alkaline-earth metal salt solution (e.g., deionized water in which acetate of alkali earth metal is dissolved) is dripped to the slurry. The slurry is then sufficiently stirred. Then, the slurry is heated and further stirred, so that the water in the slurry completely evaporates. After the evaporation of the water, the obtained dried substance is pulverized, and then calcined in the air at 500° C. for two hours. Thus, obtained is catalyst powder including the multiple kinds of activated alumina each loaded with the Pt and the carbonate of the alkali earth metal. In this step, the full amount of the alkali earth metal to be contained in the catalyst 20 is loaded on the activated alumina Ethanolamine Pt is a complex of ethanolamine and Pt. Unlike a Pt material (Pt—P salt) having square planar molecular geometry in which nitro groups and amine groups are coordinated to a Pt atom, ethanolamine Pt has octahedral molecular geometry in which hydroxyl groups are coordinated to a Pt atom. In addition, the complex is large in size because ethanolamine ($NH_3C_2H_5OH$) is present around the Pt— hydroxyl group complex. Hence, the use of the ethanolamine Pt keeps most of the complexes from entering the pores of the activated alumina and the active-oxygen-release material, and allows the complexes to be loaded on surfaces of the activated alumina and the active-oxygen-release material. Specifically, Pt may be provided in large amount on the surfaces of these supports. The provided Pt may increase the chance that the Pt and the exhaust gas make contact with each other, and improve efficiency in oxidizing NO, included in the exhaust gas, by Pt to generate a larger amount of $NO_2$. As a result, the efficiency in PM combustion may improve.

—Coating Filter Body with Powdered Catalyst—

An activated alumina powdered catalyst (powder of pure alumina and La-containing alumina each loaded with Pt and alkali earth metal) and an active-oxygen-release powdered material (powder of an Rh-doped CeZrNd composite oxide and a ZrNdPr composite oxide each loaded with Pt) are mixed together. A zirconia-binder solution and deionized water are added to the mixed powder. Then, the powder is mixed to be slurry. The slurry is pulverized using a ball mill until its number average particle diameter ranges approximately from 200 nm to 400 nm (beneficially, approximately 300 nm). This slurry is loaded on the filter body. Then, the slurry-coated filter body is dried at 150° C. in the air, and calcined in the air at 500° C. for two hours. As a result, a catalyzed filter is obtained.

Here, when the activated alumina powdered catalyst and the active-oxygen-release material are mixed to form the slurry, a portion of alkali earth metal dissolves from the activated alumina in the slurry, and is loaded on the active-oxygen-release material (the Rh-doped CeZrNd composite oxide and the ZrNdPr composite oxide).

Examples and Comparative Examples

Sr was adopted as the alkali earth metal. The above method for manufacturing a catalyzed filter was used to prepare filters for respective Examples 1 to 6. As Table 1 shows, each of the filters has a different amount of Sr loaded on activated alumina. Aside from these filters, other filters were prepared for respective Comparative Examples 1 to 7. Table 2 shows the data of the filter body, the activated alumina, and the active-oxygen-release material used in Examples and Comparative Examples.

TABLE 1

| | Loaded Amount of Sr to Activated alumina | | Amount of Sr to Active-Oxygen-Release Material |
|---|---|---|---|
| | % by Mass | g/L | % by Mass |
| Example 1 | 3 | 0.22 | 0.11 |
| Example 2 | 5 | 0.36 | 0.17 |
| Example 3 | 8 | 0.58 | 0.28 |
| Example 4 | 11 | 0.80 | 0.39 |
| Example 5 | 14 | 1.02 | 0.50 |
| Example 6 | 28 | 2.03 | 1.00 |
| Comparative Example 1 | 0 | 0 | 0 |
| Comparative Example 2 | 3 | 0.22 | 1.20 |
| Comparative Example 3 | 5 | 0.36 | 2.00 |
| Comparative Example 4 | 8 | 0.58 | 3.20 |
| Comparative Example 5 | 14 | 1.02 | 5.60 |
| Comparative Example 6 | 23 | 1.67 | 9.20 |
| Comparative Example 7 | 28 | 2.03 | 11.20 |

The symbol "g/L" denotes a loaded amount of Sr per L of the filter body.
The "% by Mass" denotes a percentage by mass of Sr to the activated alumina or the active-oxygen release material.

TABLE 2

| | |
|---|---|
| Filter Body | Honeycomb structure made of SiC (Capacity: 25 mL, Cell wall thickness: 16 mil, Number of cells: 178 cpsi) |
| Activated alumina | Pure Alumina (γ-alumina); Loaded amount 3.64 g/L Alumina containing 4% by mass of $La_2O_3$; Loaded amount: 3.63 g/L |
| Total Amount of Loaded Pt: 0.33 g/L | |
| Active-Oxygen-Release Material | Rh-doped CeZrNd composite oxide; Loaded amount: 7.27 g/L $CeO_2:ZrO_2:Nd_2O_3$ = 24:72:4 (mol %) Doped amount of Rh; 0.1% by mass to CeZrNd composite oxide ZrNdPr composite oxide; Loaded amount: 10.91 g/L $ZrO_2:Nd_2O_3:Pr_2O_3$ = 70:12:18 (mol %) |
| Total Amount of Loaded Pt: 0.17 g/L | |
| Binder | Loaded amount: 2.54 g/L |

The "Loaded amount" is a loaded amount per L of the filter body.

In each Example, a portion of the alkali earth metal dissolves from the activated alumina in the slurry, and is loaded on the active-oxygen-release material as described before. However, the experiments show that approximately 10% by mass of the alkali earth metal, originally loaded on the activated alumina, dissolves in the slurry and is loaded on the active-oxygen-release material and the binder. In each Example shown in Table 1, the amounts of Sr loaded on the activated alumina and on the active-oxygen-release material are calculated, on the assumption that 90% by mass of the total amount of the Sr previously loaded on the activated alumina stays on the activated alumina, and 8% by mass of the total amount of the Sr is loaded on the active-oxygen-release material via the slurry.

In Comparative Example 1, Pt alone is loaded on activated alumina. This Pt-loaded activated alumina and Pt-loaded active-oxygen-release material are mixed together, and the filter body is coated with the mixture. In each of Comparative Examples 2 to 7, the coating layer is impregnated with an Sr solution, so that Sr is loaded on the activated alumina and the active-oxygen-release material. Specific preparation techniques in Comparative Examples 2 to 7 are described below.

Multiple kinds of activated alumina (pure aluminum and La-containing aluminum) are mixed together. Deionized water is added to the mixture so that the mixture become slurry. This slurry is sufficiently stirred with a stirrer, for example. While the slurry is kept stirred, a predetermined amount of ethanolamine Pt is dripped to the slurry. Then, the mixture is further stirred. Then, the product thus obtained is further stirred under heat to completely vaporize the water. After the evaporation of the water, the obtained dried substance is pulverized, and calcined in the air at 500° C. for two hours. Then, obtained is powdered catalyst in which the Pt was loaded on the multiple kinds of the activated alumina.

A powdered catalyst having the activated alumina (the pure alumina and the La-containing alumina) loaded with the Pt alone and the above active-oxygen-release powdered material (powder of a Rh-doped CeZrNd composite oxide and a ZrNdPr composite oxide each loaded with Pt) are mixed together. A zirconia-binder solution and deionized water are added to the mixed powder. Then, the product is mixed to be slurry. The filter body is coated with this slurry. Then, the slurry-coated filter body is dried at 150° C. in the air. Then, the coating layer on the filter body is impregnated with a predetermined amount of a Sr solution (deionized water in which acetate of Sr was dissolved), and then calcined in the air at 500° C. for two hours.

[PM Combustion Performance Evaluation in Examples and Comparative Examples]

Each of the filters of Examples 1 to 6 and Comparative Examples 1 to 7 was aged for 24 hours at 800° C. in the air. Then, the PM combustion performance of the filters was studied.

First, deionized water was added to carbon black in an amount equivalent to 5 g/L. Then, the product was stirred by a stirrer so that carbon black was sufficiently dispersed. An inlet end of the aged filter was immersed in the obtained slurry, and an aspirator was used for suction on an outlet end of the filter. Water still remaining after the suction was removed by using an air blower from an end face, of the filter, immersed in the slurry. Then, the filter was dried in the air at 150° C. for two hours.

Each of the obtained filters was loaded into a fixed-bed model gas flow reactor. Then, $N_2$ gas was sent to the filter, and the temperature of the gas at the inlet of the filter was raised from a room temperature to 580° C. Once the temperature became stable at 580° C., the composition of the gas was changed to "7.5% $O_2$+300 ppm NO+$N_2$ (balance gas)," with the temperature kept at 580° C. The model gas was sent to the filter at a space velocity of 40,000/h. Then, the concentrations of CO and $CO_2$ generated through the combustion of carbon in the model gas were measured, so that a temporal change in the amount of the carbon combustion was measured. Then, obtained was how much time taken until 90% of the carbon was combusted.

Figure 7:
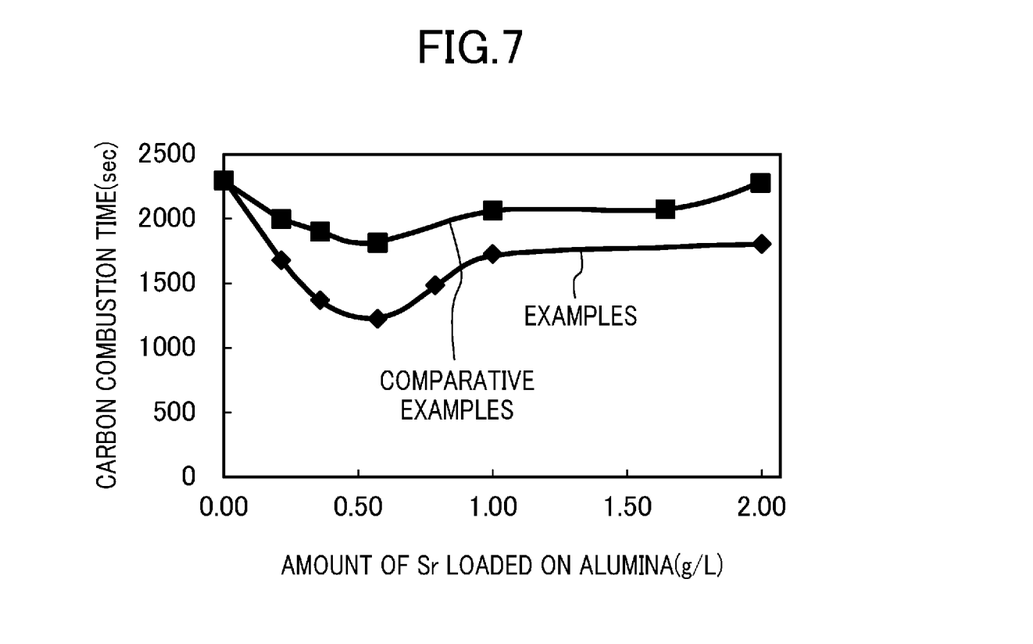
FIG. 7 is a graph illustrating carbon combustion performance in Examples and Comparative Examples according to the first embodiment.

FIG. 7 shows the results of the experiments. As FIG. 7 clearly shows, the time taken to combust 90% of the carbon is shorter in Examples in which a portion of the Sr was dissolved from the activated alumina in slurry and loaded on the active-oxygen-release material than in Comparative Examples in which the activated alumina and the active-oxygen-release material were impregnated, and loaded, with Sr. In Comparative Examples, Sr is loaded in large amount on the active-oxygen-release material, producing active oxygen acting as an oxidant for PM. However, the PM combustion performance shown in Comparative Examples is lower than that in Examples because of the reasons below.

In Comparative Examples, Sr is loaded in large amount on the active-oxygen-release materials. Such Sr covers surfaces of the Rh-doped CeZrNd composite oxide and ZrNdPr composite oxide acting as the active-oxygen-release materials. Hence, Sr keeps the Rh-doped CeZrNd composite oxide from storing and releasing oxygen, and the ZrNdPr composite oxide from exchanging oxygen. This could deteriorate the performance to release active oxygen. Moreover, Sr covers the active sites of the Rh-doped CeZrNd composite oxide and the ZrNdPr composite oxide, which could reduce the PM combustion performance.

Meanwhile, in Examples, Sr is loaded on the active-oxygen-release materials just like in Comparative Examples. However, the amount of the loaded Sr is small, which avoids deteriorating the functions of the active-oxygen-release materials. Hence, the small amount of Sr could actually promote the release of active oxygen, enhancing the PM combustion performance.

Figure 8:
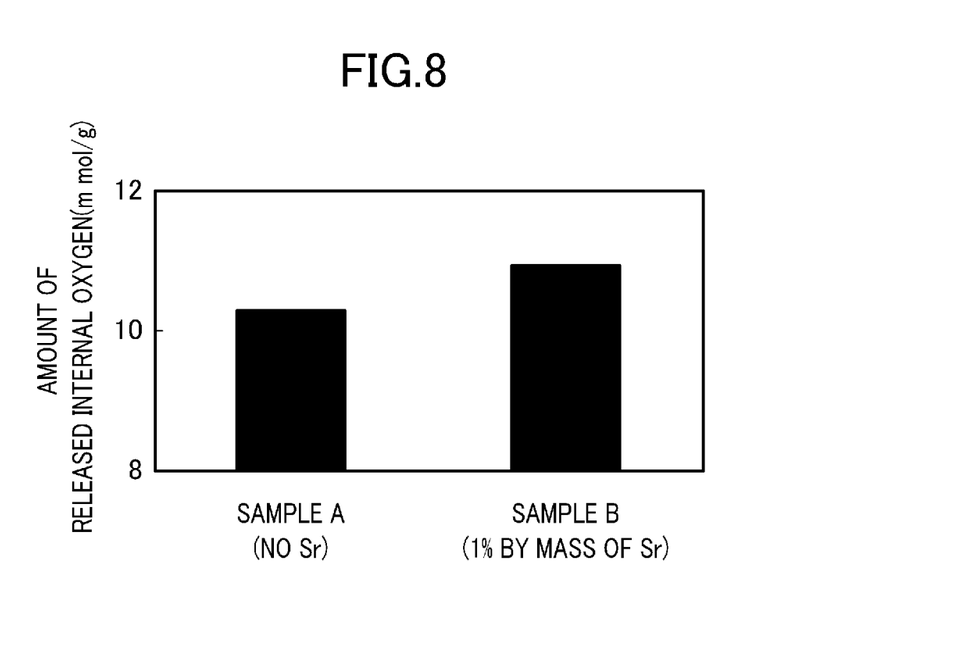
FIG. 8 is a graph illustrating an amount of released oxygen contained in alumina loaded with Pt (no Sr loaded) and in alumina loaded with Pt and a small amount of Sr.

Here, Sample A which was a ZrNdPr composite oxide loaded with Pt alone and Sample B which was a ZrNdPr composite oxide loaded with Pt and a small amount of Sr were actually prepared, and both of the samples were studied to see their performance to release internal oxygen. As illustrated in FIG. 8, the result of the study showed that Sample B loaded with a small amount of Sr released more internal oxygen than Sample A did.

Sample A is a ZrNdPr composite oxide ($ZrO_2$:$Nd_2O_3$: $Pr_2O_3$=70:12:18 (mol %)) loaded with 0.1% by mass of Pt. Sample B is a ZrNdPr composite oxide having the same composition as that of Sample A and loaded with 0.1% by mass of Pt and 1% by mass of Sr. The amount of released internal oxygen was measured as described below.

First, 80 mg of sample powder and 20 mg of carbon black are mixed together for one minute only with the weight of an agate mortar itself (tight contact). This mixed powder is weighed for 25 mg. Then, the mixed powder is tucked into silica wool, and stuffed into a silica tube. A test is conducted at an elevated temperature of 10° C./min in a 3.5%$^{18}O_2$/He stream (a total flow rate of 100 cc/min). A quadruple mass spectrometer is used to measure a concentration of $CO_2$ ($C^{16}O_2$, $C^{18}O_2$, $C^{16}O^{18}O$) produced through the reaction of carbon oxidized by $^{16}O$ in the material and $^{18}O$ in the stream. Based on the concentration of $CO^2$ including $^{16}O$ ($C^{16}O_2$, $C^{18}O_2$), obtained is the amount of active oxygen $^{16}O$ released from the surface or bulk of an oxide used for combusting the carbon.

Figure 9:
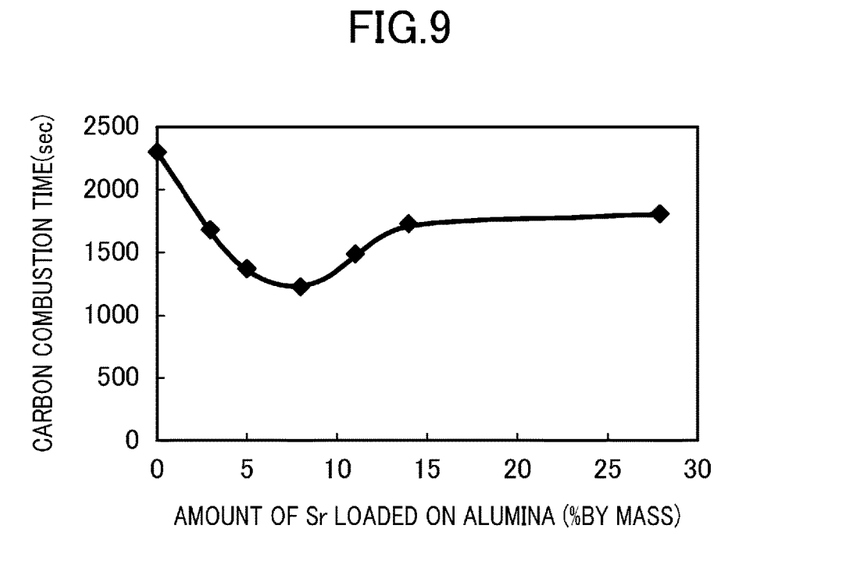
FIG. 9 is a graph illustrating data, of Examples in FIG. 7, of which an amount of loaded Sr is converted into percentage by mass.

FIG. 9 illustrates the data, of Examples in FIG. 7, whose amount of loaded Sr is converted into percent by mass. As FIG. 9 shows, the percentage by mass of Sr to activated alumina beneficially ranges from 3% by mass to 14% by mass.

[Time Taken to Combust 30% to 90% of Carbon]

Figure 10:
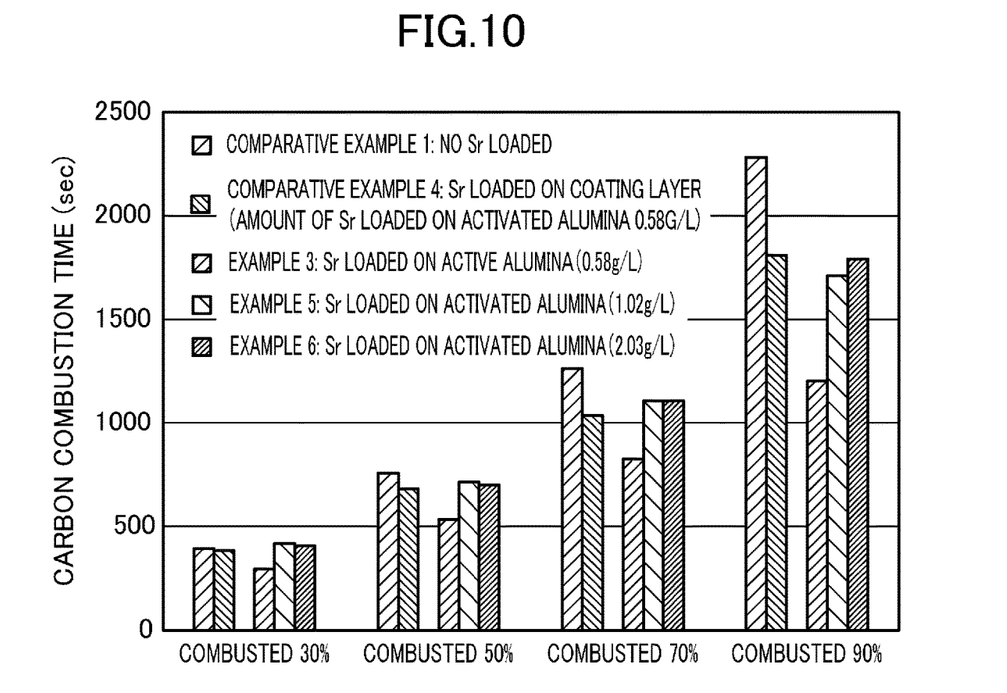
FIG. 10 is a graph illustrating carbon combustion performance of each of catalysts.

Each of the filters of Examples 3, 5, and 6 and Comparative Examples 4 and 8 was aged for 24 hours at 800° C. in the air. Then, checked was how much time taken to combust 30%, 50%, 70%, and 90% of the carbon. FIG. 10 shows the results of the experiments. The time for combusting 30%, 50%, and 70% of the carbon is similar to the time for combusting 90% of the carbon. However, the combustion time becomes longer in an exponential manner with larger percentage of the carbon combusted.

Second Embodiment

Figure 11:
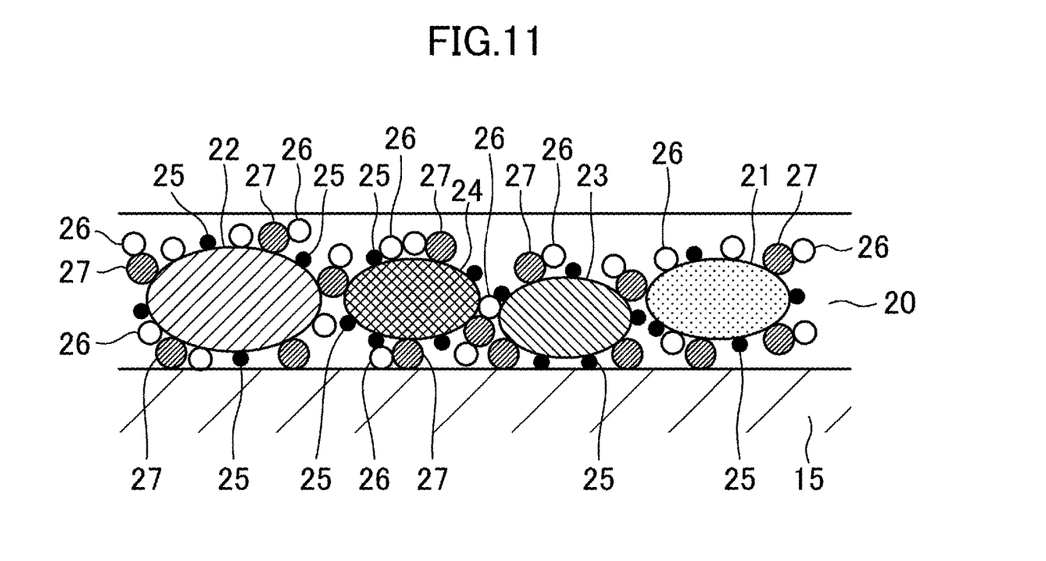
FIG. 11 is a cross-sectional view schematically illustrating a configuration of a catalyst of a catalyzed filter according to a second embodiment.

As illustrated in FIG. 11, this second embodiment is different in the structure of the catalyst 20 from the first embodiment. This catalyst 20 has supports (the activated aluminas 21 and 22 and the active-oxygen-release materials 23 and 24) bonded together. Moreover, the alkali earth metal 26 is loaded on a binder 27 holding the catalyst 20 onto the partitions 15. The binder 27 includes oxide particles finer than those of the activated aluminas 21 and 22. Other than that, the structure of the catalyst 20 in the second embodiment is the same as that of the catalyst 20 in the first embodiment.

Specifically, two kinds of alumina; namely the activated aluminas 21 and 22, mainly include γ-alumina. One is the above pure alumina 21. The other is the above La-containing alumina 22. Each of the activated aluminas 21 and 22 is loaded with the Pt 25 and the alkali earth metal 26 as catalytic metals. The catalytic metal is not limited to Pt 25, and other catalytic metal such as Pd may be used. Two or more kinds of catalytic metal may be loaded on the activated aluminas 21 and 22.

Of two kinds of the active-oxygen-release materials 23 and 24, the active-oxygen-release material 23 includes a Ce-containing composite oxide and the active-oxygen-release material 24 includes a Ce-free Zr-based composite oxide. In this embodiment, the above Rh-doped CeZrNd composite oxide is adopted as the active-oxygen-release material 23, and the ZrNdPr composite oxide is adopted as the active-oxygen-release material 24. The active-oxygen-release materials 23 and 24 also loaded with the Pt 25. The active-oxygen-release material 24 may beneficially have an average pore size ranging from 20 nm to 60 nm.

It is also beneficial that the second embodiment is the same as the first embodiment in that the total amount of the activated aluminas 21 and 22, the amount of each of the active-oxygen-release materials 23 and 24, the mass ratio between the activated aluminas 21 and 22, the total amount of the Pt 25 loaded on the mixed activated aluminas 21 and 22, and the amount of Pt loaded on each of the active-oxygen-release materials 23 and 24. The loaded amount of the alkali earth metal to the activated aluminas 21 and 22, and on the binder 27 will be described later.

[How to Manufacture Catalyzed Filter]

Similar to the first embodiment, the activated alumina (pure alumina) 21, the activated alumina (La-containing alumina) 22, the active-oxygen-release material (Rh-doped CeZrNd composite oxide) 23, and the active-oxygen-release material (ZrNdPr composite oxide) 24 are prepared. Then, Pt and alkali earth metal are loaded on the activated aluminas 21 and 22, and Pt is loaded on the active-oxygen-release materials 23 and 24.

—Loading Alkali Earth Metal on Binder—

The binder (e.g., alumina sol) 27 is dissolved in deionized water, and sufficiently stirred by a stirrer, for example. Then, a predetermined amount of alkaline-earth metal salt (e.g., acetate of alkali earth metal) is dissolved in the binder 27. Then, the binder 27 is further stirred under heat so that the water in the binder 27 completely evaporates. After the evaporation of the water, the obtained dried solid substance is pulverized, and then calcined in the air at 500° C. for two hours. Thus, carbonate of the alkali earth metal is loaded on the binder 27. The product thus obtained is pulverized by a ball mill until its number average particle diameter ranges approximately from 30 nm to 150 nm. Then, deionized water is added to the pulverized product, and thus a binder loaded with alkali earth metal may be obtained.

Another technique may also be adopted to load alkali earth metal on a binder. Specifically, the alkali earth metal salt is dissolved in deionized water including a binder. Then, the binder is sufficiently stirred with a stirrer, for example. Next, an aqueous ammonium solution is dripped to the binder to adjust the pH of the binder to be 7 to 8. The product thus obtained is stirred by a stirrer, for example, which allows a precursor of the alkali earth metal to be deposited on particles of the binder. Thereafter, similar to the above loading technique, the water is completely evaporated, and the resulting dried solid substance is pulverized, and then calcined. The calcined substance is then pulverized by a ball mill to have a predetermined average particle diameter. Then, deionized water is added to the pulverized substance, and thus a binder loaded with alkali earth metal may be obtained.

—Coating Filter Body with Powdered Catalyst—

A powdered activated alumina catalyst (powder of pure alumina and La-containing alumina each loaded with Pt and alkali earth metal), an active-oxygen-release powdered material (powder of an Rh-doped CeZrNd composite oxide and a ZrNdPr composite oxide each loaded with Pt), and a binder loaded with alkali earth metal are mixed together. Deionized water is added to, and mixed with, the obtained powder mixture. Then, the product is mixed to be slurry. The slurry is then pulverized by a ball mill until its number average particle diameter ranges approximately from 200 nm to 400 nm (beneficially, approximately 300 nm). The filter body is coated with this pulverized slurry. Then, the product thus obtained is dried at 150° C. in the air, and calcined in the air at 500° C. for two hours. As a result, a catalyzed filter is obtained.

In the catalyzed filter, the active-oxygen-release material is loaded with a small amount of Sr having dissolved from the activated alumina and the binder in the slurry.

Examples and Comparative Examples

Sr was used as the alkali earth metal, and an alumina binder was used as the binder. The above method for manufacturing a catalyzed filter was used to prepare filters for respective Examples 7 to 14 and Comparative Examples 8 and 9. Table 2 shows the data of the filter body, the activated alumina, and the active-oxygen-release material used in Examples and Comparative Examples.

Here, Examples 7 to 14 are the same as Comparative Examples 8 and 9 in the total amount of Sr; namely 0.58 g/L, contained in a catalyst. As illustrated in Table 3, however, Examples 7 to 14 are different from Comparative Examples 8 and 9 in the amount of Sr loaded on the binder. In Comparative Example 8, a catalyzed filter was prepared with the full amount of Sr loaded on the binder. In Comparative Example 9, a catalyzed filter was prepared with the full amount of Sr loaded on the activated alumina. In Examples 7 to 14, a catalyzed filter was prepared with Sr separately loaded on the activated alumina and the binder.

TABLE 3

| | Percentage of Loaded Amount of Sr to Binder (% by Mass) | Percentage of Loaded Amount of Sr to Activated alumina (% by Mass) | Percentage of Amount of Sr loaded on Activated alumina in Total Amount of Sr (% by Mass) |
|---|---|---|---|
| Comparative Example 8 | 22.8 | 0 | 0 |
| Example 7 | 19.9 | 1 | 12 |
| Example 8 | 17.1 | 2 | 24 |
| Example 9 | 14.2 | 3 | 36 |
| Example 10 | 11.4 | 4 | 48 |
| Example 11 | 8.5 | 5 | 61 |
| Example 12 | 5.7 | 6 | 73 |

TABLE 3-continued

| | Percentage of Loaded Amount of Sr to Binder (% by Mass) | Percentage of Loaded Amount of Sr to Activated alumina (% by Mass) | Percentage of Amount of Sr loaded on Activated alumina in Total Amount of Sr (% by Mass) |
|---|---|---|---|
| Example 13 | 2.8 | 7 | 85 |
| Example 14 | 1.1 | 7.8 | 95 |
| Comparative Example 9 | 0 | 8.25 | 100 |

[PM Combustion Performance Evaluation in Examples and Comparative Examples]

Figure 12:
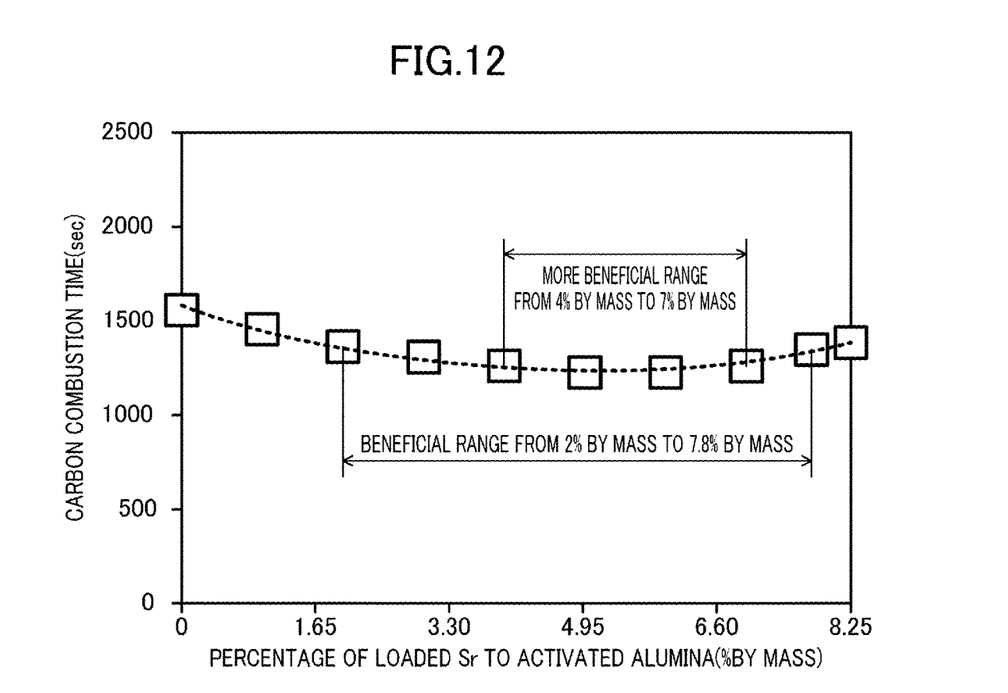
FIG. 12 is a graph illustrating a relationship between carbon combustion performance and a percentage of loaded Sr to activated alumina.
Figure 13:
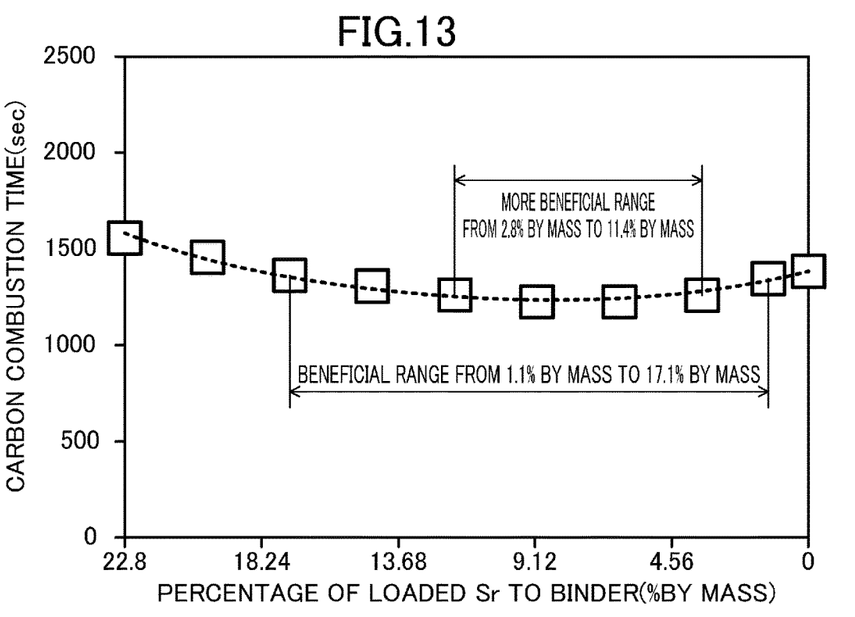
FIG. 13 is a graph illustrating a relationship between carbon combustion performance and a percentage of loaded Sr to a binder.
Figure 14:
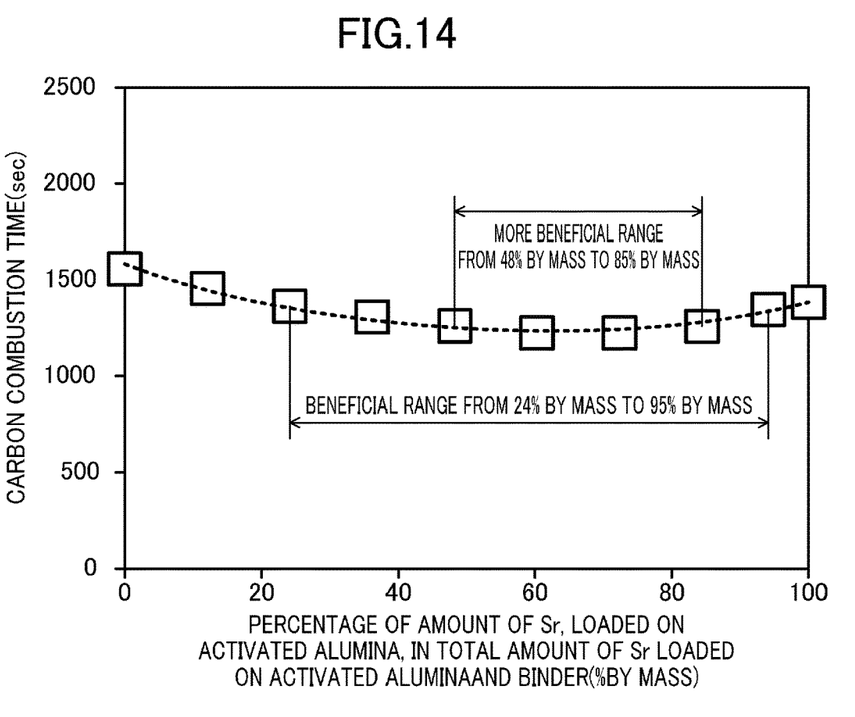
FIG. 14 is a graph illustrating a relationship between carbon combustion performance and a percentage of Sr loaded on activated alumina in the total amount of Sr loaded on the activated alumina and the binder.

Each of the filters in Examples 7 to 14 and Comparative Examples 8 and 9 was aged for 24 hours at 800° C. in the air. Then, PM combustion performance of the filters (the time taken until 90% of the carbon was combusted) was studied, using the PM combustion performance evaluation technique described before. FIGS. 12 to 14 show the results of the study. In the graphs of respective FIGS. 12 to 14, the leftmost plot represents Comparative Example 8, the rightmost plot represents Comparative Example 9, and the eight plots in the middle represent Examples 7 to 14 starting from the left.

As clearly seen in FIGS. 12 to 14, the carbon combustion time tends to be short when the Sr is separately loaded on activated alumina and binder.

Comparative Example 9 (the full amount of the Sr is loaded on the activated alumina) shows that the carbon combustion time is long since active sites of the activated alumina are covered by Sr, such that the effect of deterioration in carbon combustion caused by the reduction of the active sites exceeds the effect of improvement in carbon combustion by active oxygen released due to dissolution of Sr nitrate.

In Examples, a portion of Sr is loaded on the binder, and thus few active sites of the activated alumina are covered by Sr. As a result, Pt loaded on the activated alumina works effectively for the combustion of the carbon. In addition, the active oxygen released by the dissolution of the Sr nitrate loaded on the binder and the activated alumina promotes the carbon combustion.

However, if a percentage of the loaded Sr to the activated alumina became small, and relatively, a percentage of the loaded Sr to the binder became large, the carbon combustion performance deteriorates. Pt loaded on the activated alumina encourages Sr to store NOx in the exhaust gas; whereas it is difficult to provide the effect of encouraging Sr loaded on the binder to store NOx. As a result, the total amount of the active oxygen, to be released by the dissolution of the nitrite that encourages the combustion of the particle, decreases with increasing amount of Sr to the binder.

As previous explanations clearly show, in the catalyzed filter, Sr dissolved from the activated alumina and the binder in the slurry is loaded in small amount on the active oxygen release material.

When Sr is separately loaded on the activated alumina and the binder, FIG. 12 shows that a percentage of loaded Sr to the activated alumina beneficially ranges from 2% by mass to 7.8% by mass, and more beneficially, from 4% by mass to 7% by mass. In this separate loading, FIG. 13 shows that a percentage of loaded Sr to the binder beneficially ranges from 1.1% by mass to 17.1% by mass, and more beneficially, from 2.8% by mass to 11.4% by mass. Moreover, in this separate loading, FIG. 14 shows that a percentage of the amount of Sr, to be loaded on the activated alumina, in the total amount of Sr to be loaded on the activated alumina and the binder beneficially ranges from 24% by mass to 95% by mass, and more beneficially, from 48% by mass to 85% by mass.

<Other Alkali Earth Metal>

Prepared samples were a powdered activated alumina sample loaded with Pt and four kinds of powdered activated alumina samples each loaded with Pt and carbonate including one kind of alkali earth metal. Each sample was mixed with 20 mg of carbon black for one minute only with the weight of an agate mortar itself (tight contact). Each mixed sample was weighed for 5 mg, and placed in a differential thermal analyzer (DTA). A test was conducted at an elevated temperature of 10° C./min in a "20% $O_2$+500 ppm$NO_2$/$N_2$" stream (a total flow rate of 100 cc/min). Commercially available α-alumina powder was used as a reference in the DTA analysis. Peak temperatures of heat generated in association with combustion of carbon were read.

Figure 15:
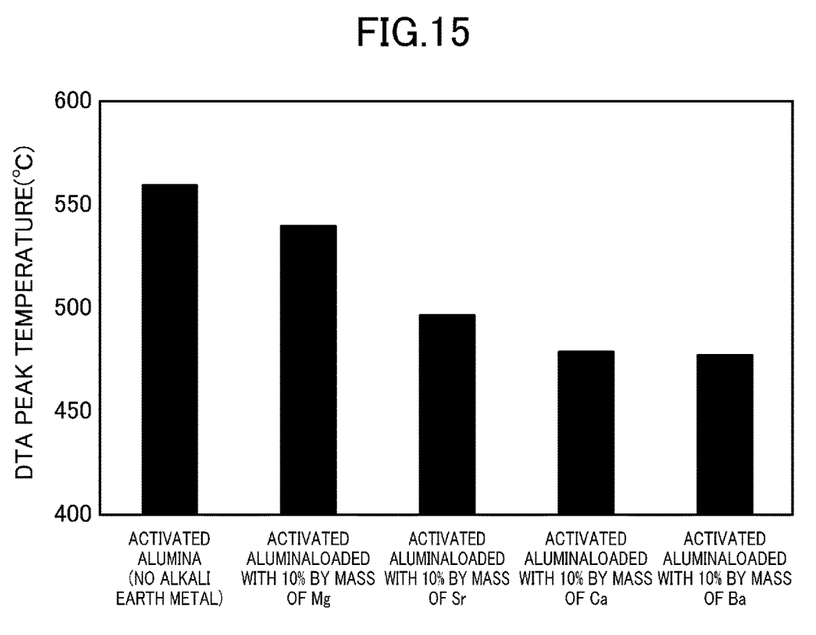
FIG. 15 is a graph illustrating peak top temperatures of an exothermic peak generated in association with combustion of carbon produced from (i) activated alumina powder loaded with Pt alone and (ii) activated alumina powder loaded with various kinds of alkali earth metal.

FIG. 15 shows the results of the study. The samples loaded with the alkali earth metal are lower in DTA peak temperature than the sample with no alkali earth metal loaded. The loaded alkali earth metal improves the PM combustion performance. The exothermic DTA peak top temperatures are lower in the order of Mg, Sr, Ca and Ba. When Ba is loaded, the PM starts to combust at the lowest temperature.

In the above embodiments, one kind of alkali earth metal is loaded on the activated alumina and the active-oxygen-release material; however, two or more kinds of alkali earth metal may be loaded.

DESCRIPTION OF REFERENCE CHARACTERS

10 Catalyzed Filter
11 Exhaust Gas Pathway
12 Exhaust Gas Inlet Path (Exhaust Gas Pathway of Filter)
13 Exhaust Gas Outlet Path (Exhaust Gas Pathway of Filter)
14 Plug
15 Partition (Exhaust Gas Pathway Wall)
16 Pore (Exhaust Gas Pathway of Filter)
20 Catalyst
21 Pure Alumina (Activated alumina)
22 La-containing Alumina (Activated alumina)
23 Ce-free Zr-based Composite Oxide
24 Ce-containing Zr-based Composite Oxide
25 Pt (platinum)
26 Alkali Earth Metal

The invention claimed is:
1. A particulate filter comprising:
a filter body configured to collect particulates included in exhaust gas;
an exhaust gas pathway wall included in the filter body; and
a catalyst provided for the exhaust gas pathway, and configured to combust the particulates, wherein
the catalyst contains activated alumina, an active-oxygen-release material, catalytic metal, and alkali earth metal,
the active-oxygen-release material including at least one oxide taking in oxygen included in the exhaust gas and releasing the oxygen taken in as active oxygen,
the alkali earth metal is loaded on each of the activated alumina and the active-oxygen-release material,
a percentage by mass of the alkali earth metal, loaded on the active-oxygen-release material, to the active-oxygen-release material is 1% by mass or smaller, and smaller than a percentage by mass of the alkali earth metal, loaded on the activated alumina, to the activated alumina, the active-oxygen-release material includes a Ce-containing composite oxide and a Ce-free Zr-based composite oxide, an amount of the alkali earth metal loaded on the activated alumina is greater than a total amount of the alkali earth metal loaded on the Ce-containing composite oxide and the Ce-free Zr-based composite oxide.

2. The particulate filter of claim 1 wherein
a percentage by mass of the alkali earth metal, loaded on the activated alumina, to the activated alumina ranges from 3% by mass to 14% by mass.

3. The particulate filter of claim 1, wherein
the alkali earth metal includes at least Sr.

4. The particulate filter of claim 1, wherein
the catalytic metal includes at least one of Pt or Pd.

5. The particulate filter of claim 1, wherein
the catalyst further includes a binder finer than particles of the activated alumina, and the alkali earth metal is loaded on each of the activated alumina, the active-oxygen-release material, and the binder, and
a total amount of the alkali earth metal, loaded on each of the activated alumina and the binder, is 90% by mass or greater of a full amount of the alkali earth metal included in the catalyst.

6. The particulate filter of claim 5, wherein
a percentage of the loaded alkali earth metal to the activated alumina ranges from 2% by mass to 7.8% by mass, and
a percentage of the loaded alkali earth metal to the binder ranges from 1.1% by mass to 17.1% by mass.

7. The particulate filter of claim 5, wherein
a percentage of an amount of the alkali earth metal, loaded on the activated alumina, in the total amount of the alkali earth metal loaded on each of the activated alumina and the binder ranges from 24% by mass to 95% by mass.

8. The particulate filter of claim 1, wherein
a percentage of an amount of the alkali earth metal, loaded on the activated alumina, in the total amount of the alkali earth metal loaded on each of the activated alumina and the binder ranges from 24% by mass to 95% by mass.

9. A method for manufacturing the particulate filter of claim 1, comprising:
loading the alkali earth metal on the activated alumina;
forming slurry which is a mixture of the activated alumina loaded with the alkali earth metal and the active-oxygen-release material, such that a portion of the alkali earth metal, dissolving from the activated alumina in the slurry, is loaded on the active-oxygen-release material;
coating the filter body with the slurry; and
loading the catalytic metal either on the activated alumina and the active-oxygen-release material before the forming of the slurry, or on a coating layer formed when the filter body is coated with the slurry.

10. The method for manufacturing the particulate filter of claim 9, wherein
the preparing further includes preparing a binder finer than particles of the activated alumina,
the alkali earth metal is loaded on each of the activated alumina and the binder, and
in the forming, the slurry is a mixture of the activated alumina loaded with the alkali earth metal, the binder loaded with the alkali earth metal, and the active-oxygen-release material.

* * * * *